(12) United States Patent
Orihara

(10) Patent No.: US 11,938,858 B2
(45) Date of Patent: Mar. 26, 2024

(54) HEADLIGHT CONTROL DEVICE, HEADLIGHT CONTROL SYSTEM, AND HEADLIGHT CONTROL METHOD

(71) Applicant: Hitachi Astemo, Ltd., Hitachinaka (JP)

(72) Inventor: Nobuya Orihara, Hitachinaka (JP)

(73) Assignee: HITACHI ASTEMO, LTD., Ibaraki (JP)

(*) Notice: Subject to any disclaimer, the term of this patent is extended or adjusted under 35 U.S.C. 154(b) by 327 days.

(21) Appl. No.: 17/612,480

(22) PCT Filed: Jun. 2, 2020

(86) PCT No.: PCT/JP2020/021704
§ 371 (c)(1),
(2) Date: Nov. 18, 2021

(87) PCT Pub. No.: WO2020/250746
PCT Pub. Date: Dec. 17, 2020

(65) Prior Publication Data
US 2022/0194291 A1 Jun. 23, 2022

(30) Foreign Application Priority Data
Jun. 12, 2019 (JP) .................. 2019-109494

(51) Int. Cl.
*B60Q 1/14* (2006.01)
*B60Q 9/00* (2006.01)
(Continued)

(52) U.S. Cl.
CPC .......... *B60Q 1/1423* (2013.01); *G06V 20/56* (2022.01); *G06V 20/625* (2022.01);
(Continued)

(58) Field of Classification Search
CPC ............ B60Q 2300/42; B60Q 2300/41; B60Q 1/143; B60Q 9/00; B60Q 2300/056
See application file for complete search history.

(56) References Cited

U.S. PATENT DOCUMENTS

2017/0234976 A1* 8/2017 Grauer ................... G01S 17/18
356/5.04
2021/0046862 A1* 2/2021 Wang ................... G06V 20/584

FOREIGN PATENT DOCUMENTS

JP H10-096626 A 4/1998
JP 2012-001079 A 1/2012
(Continued)

OTHER PUBLICATIONS

International Search Report, PCT/JP2020/021704, dated Sep. 15, 2020 (2 pgs.).

*Primary Examiner* — Wei (Victor) Y Chan
(74) *Attorney, Agent, or Firm* — Volpe Koenig

(57) ABSTRACT

A headlight control device which recognizes an oncoming vehicle using a camera without dazzling the driver of the oncoming vehicle includes a sequence control section that generates a headlight control signal from an image captured by the camera mounted on the vehicle, and a control value calculation section that calculates a control value for a light distribution pattern in the headlight control signal. An image recognition program includes a license plate recognition section that detects a license plate of the preceding vehicle from the image, and a cut-off line recognition section that detects a cut-off line of the headlight from the image. The control value calculation section calculates the control value for the light distribution pattern such that the cut-off line detected by the cut-off line recognition section is positioned higher by a predetermined height than an upper end of the license plate detected by the license plate recognition section.

15 Claims, 6 Drawing Sheets

(51) Int. Cl.
*G06V 20/56* (2022.01)
*G06V 20/62* (2022.01)
*H05B 47/125* (2020.01)

(52) U.S. Cl.
CPC ..... *H05B 47/125* (2020.01); *B60Q 2300/054* (2013.01); *B60Q 2300/41* (2013.01)

(56) References Cited

FOREIGN PATENT DOCUMENTS

| | | |
|---|---|---|
| JP | 2013-252796 A | 12/2013 |
| JP | 2017-197184 A | 11/2017 |
| WO | 2016/072484 A1 | 5/2016 |

* cited by examiner

HEADLIGHT CONTROL DEVICE, HEADLIGHT CONTROL SYSTEM, AND HEADLIGHT CONTROL METHOD

TECHNICAL FIELD

The present invention relates to a headlight control device, a headlight control system, and a headlight control method that coordinate with a camera mounted on a vehicle.

BACKGROUND ART

To prevent a vehicle accident, a preventive safety system such as advanced emergency braking (autonomous emergency braking (AEB)) has been put into practical use. In this system, an image from a camera mounted on a vehicle is used to detect an object present in front of the vehicle and estimate a distance between the object and the vehicle in many cases. Patent Literature 1 discloses a method for calculating a distance using the size of a license plate of a preceding vehicle from an image captured by a camera. Specifically, a classification number of the license plate of the preceding vehicle is recognized, and a distance between the vehicles is estimated by crosschecking and comparing the actual size of the license plate associated with the classification number in advance with the imaged size.

Patent Literature 2 discloses a headlight that accurately controls light distribution of a headlight and uses laser light for a light source. In addition, it is determined whether a characteristic structural portion of an oncoming vehicle is present based on an image captured by a camera. When the structural portion is present, irradiation by the headlight to the characteristic structural portion is suppressed or increased.

CITATION LIST

Patent Literature 1: Japanese Patent Application Laid-Open No. H10-096626
Patent Literature 2: Japanese Patent Application Laid-Open No. 2017-197184

SUMMARY OF INVENTION

Technical Problem

The shapes and sizes of vehicles that travel on roads vary, while license plates are required to be attached to the vehicles according to the laws and regulations of each country and the shapes and contents of the plates are stipulated by the laws and regulations of each country. Therefore, it is considered that, when an image captured by a camera is used for various preventive safety systems and self-driving expected to be put into practical use, it is preferable to extract a license plate from the image captured by the camera and use the extracted license plate as a reference in order to detect a preceding vehicle.

However, when a headlight does not appropriately irradiate a license plate with light at night, it may be difficult to extract a license plate of a preceding vehicle from an image captured by a camera. When a low beam is formed and a distance between an own vehicle and the preceding vehicle is long, the license plate of the preceding vehicle may not be in an irradiation range of the headlight, and may not be appropriately extracted from the image. For example, when the distance between the vehicles is calculated from the image captured by the camera in a similar manner to Patent Literature 1, the accuracy of estimating the distance between the vehicles may decrease. On the other hand, when the headlight is switched to form a high beam, a driver of the preceding vehicle may be dazzled by light and the high beam may interfere with the driving of the preceding vehicle.

Solution to Problem

According to a first aspect of the present invention, a headlight control device that controls a light distribution pattern of a headlight includes a processor, a storage device, and a headlight control program and an image recognition program that are stored in the storage device and executed by the processor. The headlight control program includes a sequence control section that generates a headlight control signal from an image captured by a camera mounted on a vehicle, and a control value calculation section that calculates a control value for the light distribution pattern in the headlight control signal. The image recognition program includes a license plate recognition section that detects a license plate of a preceding vehicle from the image, and a cut-off line recognition section that detects a cut-off line of the headlight from the image. The control value calculation section calculates the control value for the light distribution pattern such that the cut-off line detected by the cut-off line recognition section is positioned higher by a predetermined height than an upper end of the license plate detected by the license plate recognition section.

According to a second aspect of the present invention, a headlight control system includes a camera mounted on a vehicle, a camera ECU that controls the camera and generates a headlight control signal from an image captured by the camera, a headlight, a headlight ECU that controls the headlight based on the headlight control signal, and a network that connects the camera ECU to the headlight ECU such that the camera ECU and the headlight ECU are able to communicate with each other. The camera ECU detects a license plate of a preceding vehicle and a cut-off line of the headlight from the image, calculates a control value for a light distribution pattern of the headlight such that the cut-off line is positioned higher by a predetermined height than an upper end of the license plate, and generates the headlight control signal including the control value for the light distribution pattern.

According to a third aspect of the present invention, a headlight control method for controlling a light distribution pattern of a headlight of a vehicle includes detecting, from an image captured by a camera mounted on the vehicle, a license plate of a preceding vehicle, detecting a cut-off line of the headlight from the image, and calculating a control value for the light distribution pattern such that the cut-off line is positioned higher by a predetermined height than an upper end of the license plate.

Advantageous Effects of Invention

A headlight control device, a headlight control system, and a headlight control method are provided, which can recognize a preceding vehicle by means of a camera mounted on a vehicle without dazzling a driver of a preceding vehicle even at night.

Problems, configurations, and effects that are not described above will be clarified from description of the following embodiment.

DESCRIPTION OF EMBODIMENTS

Figure 1:
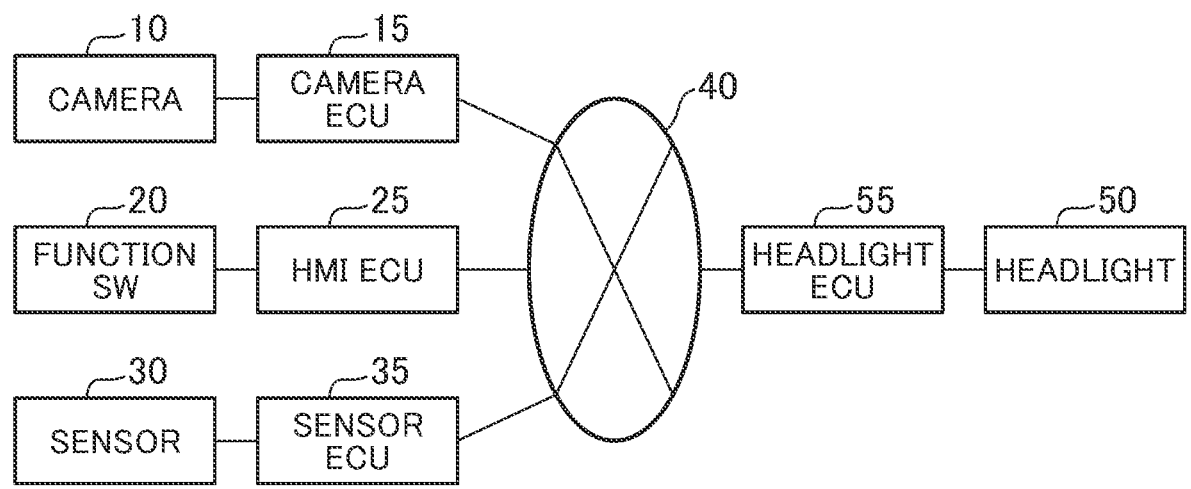
FIG. 1 is a block diagram illustrating a headlight control system.

Hereinafter, an embodiment of the present invention is described with reference to the drawings. FIG. 1 is a block diagram illustrating a headlight control system. The headlight control system includes, as its main configuration, a camera 10, a camera ECU (Electronic Control Unit) 15, a function switch (SW) 20, an HMI (Human Machine Interface) ECU 25, a sensor 30, a sensor ECU 35, a headlight 50, and a headlight ECU 55, which are connected to each other and able to communicate with each other via a network 40. As the network 40, a network mounted in a vehicle, such as a CAN (Controller Area Network) or a LIN (Local Interconnect Network), can be used.

The camera 10 is a visible light camera mounted on the vehicle and images a preceding vehicle that travels in front of the own vehicle. The camera 10 may be a monocular camera or a multiocular camera (stereo camera). The camera ECU 15 controls the camera 10 and outputs a headlight control signal to control a light distribution pattern of the headlight 50 based on an image captured by the camera 10. Details thereof are described later.

The function SW 20 is a switch that turns on or off a function of controlling the light distribution pattern of the headlight according to the present embodiment by means of an operation of a driver. For example, the function SW 20 is disposed in an instrument panel of the vehicle. The turning on and off of the function SW 20 are transferred to the camera ECU 15 from the HMI ECU 25.

As the sensor 30, a vehicle speed sensor that detects a vehicle speed is exemplified. For example, when the sensor 30 is a magnetic vehicle speed sensor, the vehicle speed sensor outputs a pulse signal based on rotation of a vehicle shaft.

The sensor ECU 35 calculates the speed of the own vehicle from the pulse signal output by the vehicle speed sensor 30 and outputs the calculated speed.

The headlight ECU 55 outputs a command value to control the headlight 50 based on the headlight control signal from the camera ECU 15. The headlight 50 changes the light distribution pattern of the headlight in accordance with the command value input from the headlight ECU 55. For example, the headlight 50 changes an angle of an optical axis of the headlight. A specific method for changing the light distribution pattern depends on the structure of the headlight, and the present invention does not presuppose that the headlight has a specific structure.

Figure 2:
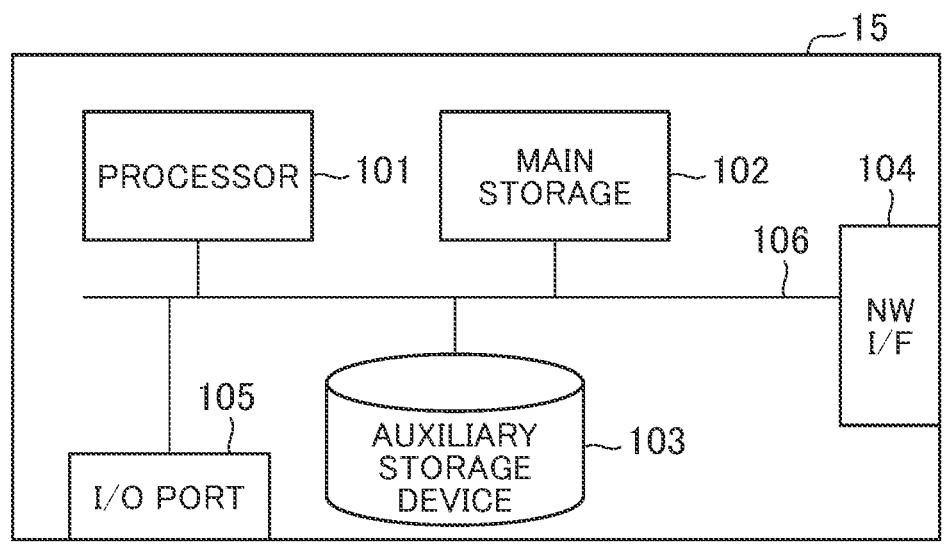
FIG. 2 illustrates an example of a hardware configuration of a camera ECU.

FIG. 2 illustrates an example of a hardware configuration of the camera ECU 15. The other ECUs illustrated in FIG. 1 have the same hardware configuration. The camera ECU 15 includes a processor 101, main storage 102, an auxiliary storage device 103, a network interface 104, and an I/O port 105, which are connected to and able to communicate with each other via a bus 106. The network interface 104 is an interface for connection to the vehicle-mounted network 40. The auxiliary storage device 103 is normally constituted by a nonvolatile memory such as a ROM (Read Only Memory) or a flash memory and stores a program to be executed by the camera ECU 15, data to be processed by the program, and the like. The main storage 102 is constituted by a RAM (Random Access Memory) and temporarily stores the program, data necessary to execute the program, and the like in accordance with a command of the processor 101. The processor 101 executes the program loaded in the main storage 102 from the auxiliary storage device 103. The I/O port 105 is a connection port for directly connecting the camera ECU 15 to an external device and is connected to the camera 10. The I/O port 105 transmits a control signal to the camera 10 and receives an image captured by the camera 10. FIG. 2 illustrates the basic hardware configuration relating to an arithmetic function of the camera ECU 15. Other hardware may be mounted based on a processing function of the camera ECU 15. For example, a DSP (Digital Signal Processor) or a PLD (Programmable Logic Device) that executes a predetermined operation in a specialized manner may be mounted.

Figure 3:
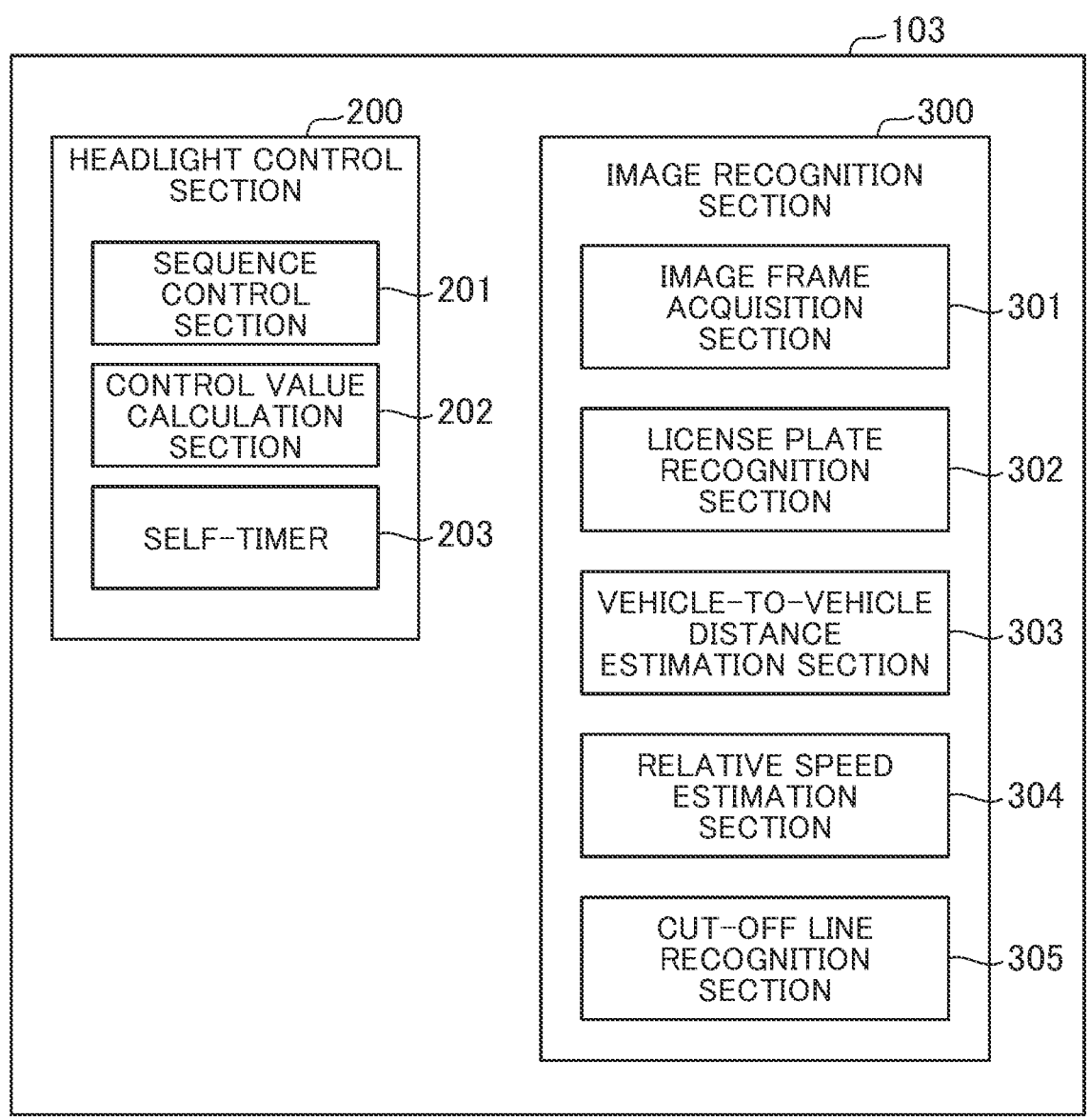
FIG. 3 illustrates functional blocks (programs) constituting a headlight control device.

FIG. 3 illustrates functional blocks constituting the headlight control device according to the present embodiment. Functions of the functional blocks are enabled by the processor 101 executing an application program stored in the auxiliary storage device 103 and collaborating with other hardware to execute a predefined process.

Therefore, in FIG. 3, the functional blocks are represented as programs stored in the auxiliary storage device 103. The programs that are executed by the processor or functions of the programs are referred to as "sections", "modules", or the like.

The headlight control device according to the present embodiment includes a headlight control section (headlight control program) 200 and an image recognition section (image recognition program) 300. The image recognition section 300 mainly includes a plurality of processing modules that execute processing using an image captured by the camera 10 in order to execute headlight control. Details of the processing of the modules are described later. The headlight control section 200 controls an overall sequence of the headlight control, calculates the control value for the light distribution pattern using execution results of the processing modules of the image recognition section 300, and outputs the headlight control signal.

Figure 4:
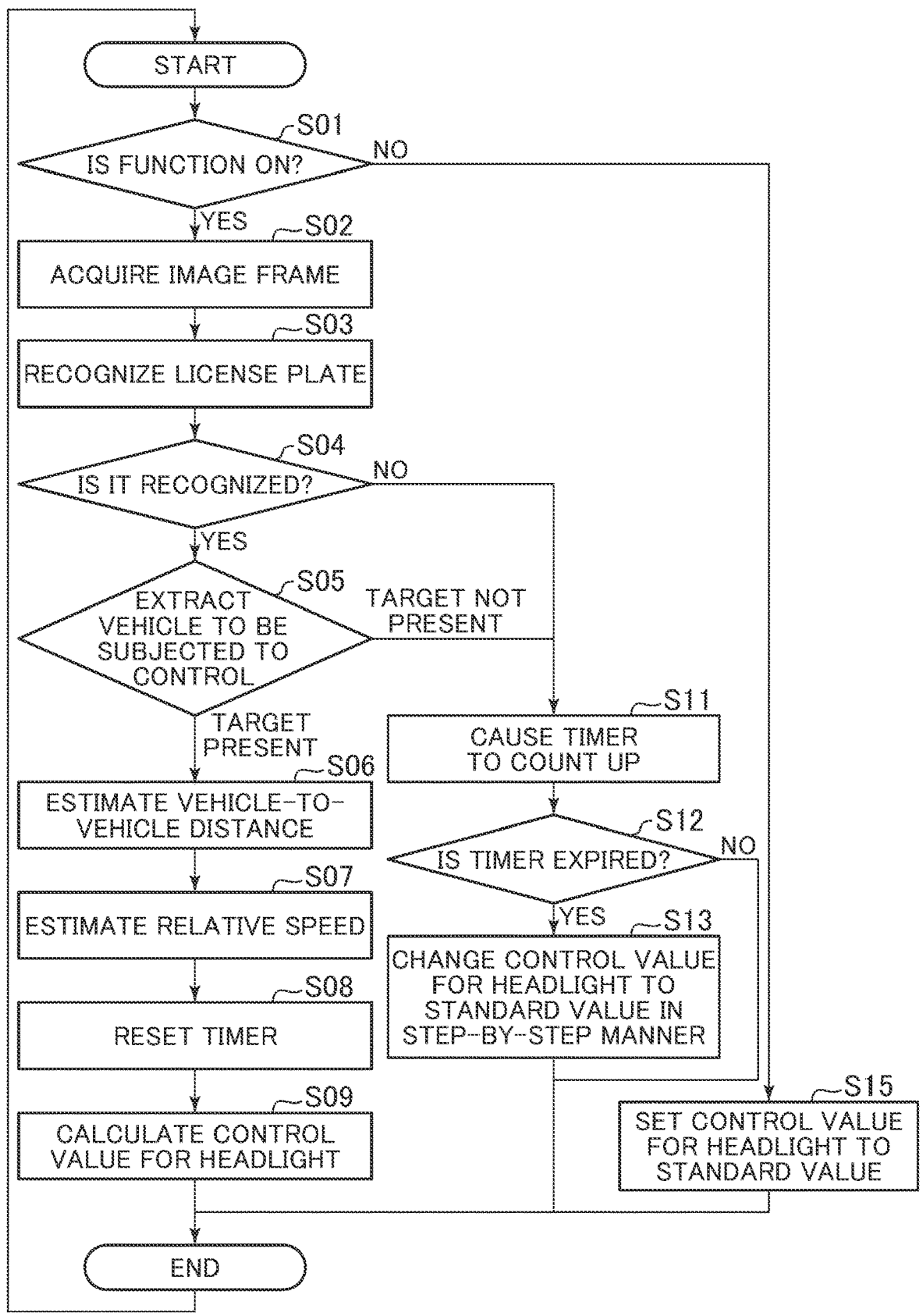
FIG. 4 is a flowchart illustrating an overall process to be executed by the headlight control device.

FIG. 4 is a flowchart describing an overall process to be executed by the headlight control device according to the present embodiment. In the following example, the case where the vehicle includes a monocular camera as the camera 10 is described. A sequence control section 201 of the headlight control section 200 controls the overall flow. The headlight control is repeatedly executed in predetermined cycles as illustrated in FIG. 4.

First, the sequence control section 201 confirms the turning on or off of the function of the headlight control system (S01). Specifically, the sequence control section 201 confirms the turning on or off of the function SW 20 from the HMI ECU 25. When the function SW 20 is off, the sequence control section 201 sets the control value for the light distribution pattern of the headlight to a standard value (S15). Therefore, in this case, as the light distribution pattern of the headlight (low beam), a light distribution pattern manually set by the driver or a light distribution pattern set by an auto-levelizer is used.

Figure 5:
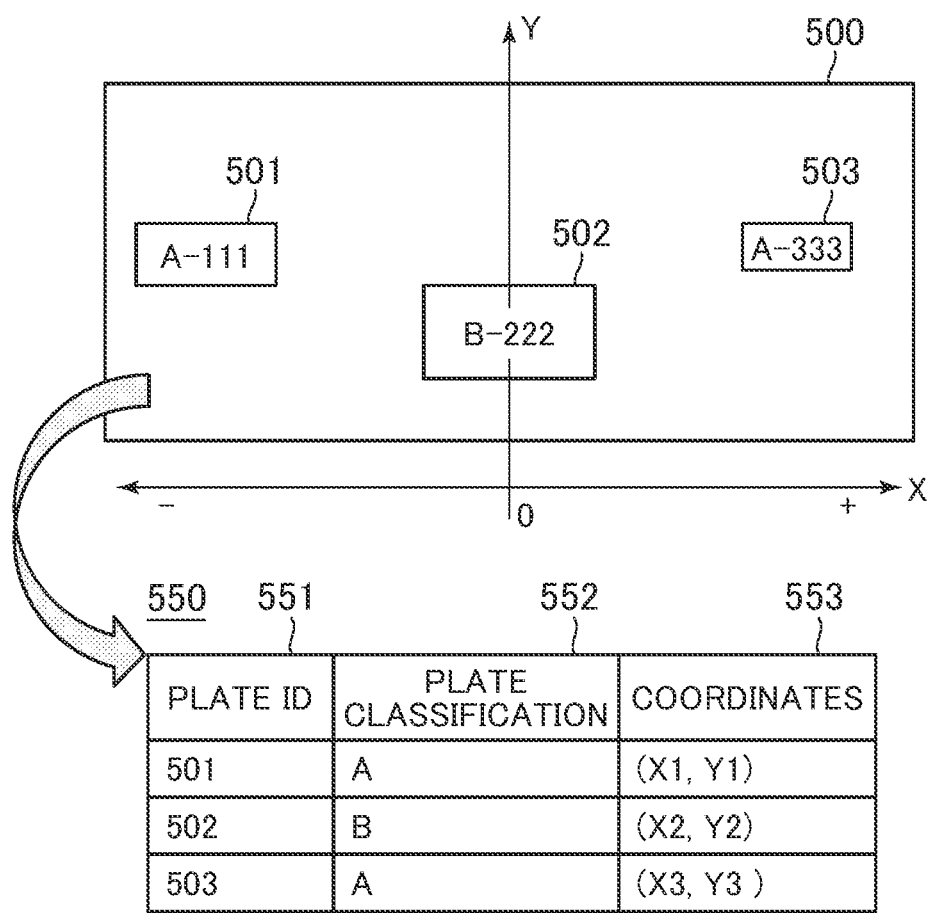
FIG. 5 is a diagram describing license plate information extracted from an image frame.

When the function SW 20 is on, the sequence control section 201 uses the processing modules of the image recognition section 300 to calculate the control value for the light distribution pattern. First, an image frame acquisition section 301 acquires an image frame from the camera 10 (S02). Subsequently, a license plate recognition section 302 extracts an image of a license plate portion from the acquired image frame to generate license plate information (S03). FIG. 5 illustrates an example of license plate information 550 extracted from an image frame 500. The license plate information 550 includes IDs 551 identifying license plates extracted from the image frame, index information 552 identifying the sizes (actual dimensions) of the license plates, and coordinate information 553 indicating the positions of the license plates in the image frame.

The image of the license plate portion can be extracted from the image frame by applying image processing such as known pattern matching. A plate ID 551 is assigned to and identifies an image of each extracted license plate portion. As described later, in this example, an actual dimension of the license plate and the size of the license plate on the image frame are used to measure a distance between the vehicles. The index information 552 is information identifying the license plate sizes (actual dimensions). A license plate size is regulated by each country, but a plurality of sizes is normally used. Therefore, it is necessary to identify the size of a license plate. The index information 552 is information identifying the license plate sizes, and it is necessary to define a license plate size according to national legislation. In Japan, the size of a license plate can be identified based on a classification number described on the license plate. In this case, a known character recognition technique is used for an image of an extracted license plate portion and the classification number described on the license plate is read and treated as the index information 552. In addition, in countries (for example, North America, Europe, and the like) in which two types of license plates for general use and for small sizes are defined, the shape (aspect ratio) of a license plate for general use is different from the shape (aspect ratio) of a license plate for a small size. In this case, the aspect ratio of a license plate is read from an image of an extracted license plate portion and treated as the index information 552.

The coordinate information 553 is positional information of the license plates in the image frame 500.

An XY plane of the image frame 500 is perpendicular to a traveling direction of the own vehicle and an Y axis extends in a vertical direction. In this example, the origin in an X axis is defined to be at the center of the own vehicle, but the method for determining coordinates is not particularly limited.

When the license plate information is extracted from the image frame in the above manner (YES in S04), the license plate recognition section 302 extracts the license plate (preceding vehicle) to be subjected to the headlight control (S05). When the license plate is recognized from the image frame and is a license plate of a vehicle traveling in another lane, it is not necessary to execute the headlight control. Therefore, the license plate to be subjected to the control is identified using coordinate information of the license plate. Specifically, the license plate recognized as a license plate of a vehicle positioned in the same lane is extracted from coordinate information (X-axis coordinate) and is subjected to the control. Therefore, it is possible to prevent the headlight control from being executed erroneously using a license plate of a vehicle traveling in an adjacent lane.

When the vehicle to be subjected to the headlight control is extracted (target present in S05), a positional relationship between the own vehicle and the preceding vehicle with the license plate to be subjected to the control is recognized. First, the vehicle-to-vehicle distance estimation section 303 estimates a distance to the control target (preceding vehicle) extracted by the license plate recognition section 302 (S06). In this example, the distance between the own vehicle and the preceding vehicle is estimated from an actual dimension of the actual license plate recognized from the index information of the license plate recognition section 302 and the size of the license plate in the image frame.

Subsequently, the relative speed estimation section 304 estimates a relative speed to the speed of the preceding vehicle based on the vehicle-to-vehicle distance calculated by the vehicle-to-vehicle distance estimation section 303, an own vehicle's speed input from the sensor ECU 35, a past value of the vehicle-to-vehicle distance, and a past value of the own vehicle's speed (S07).

Figure 6:
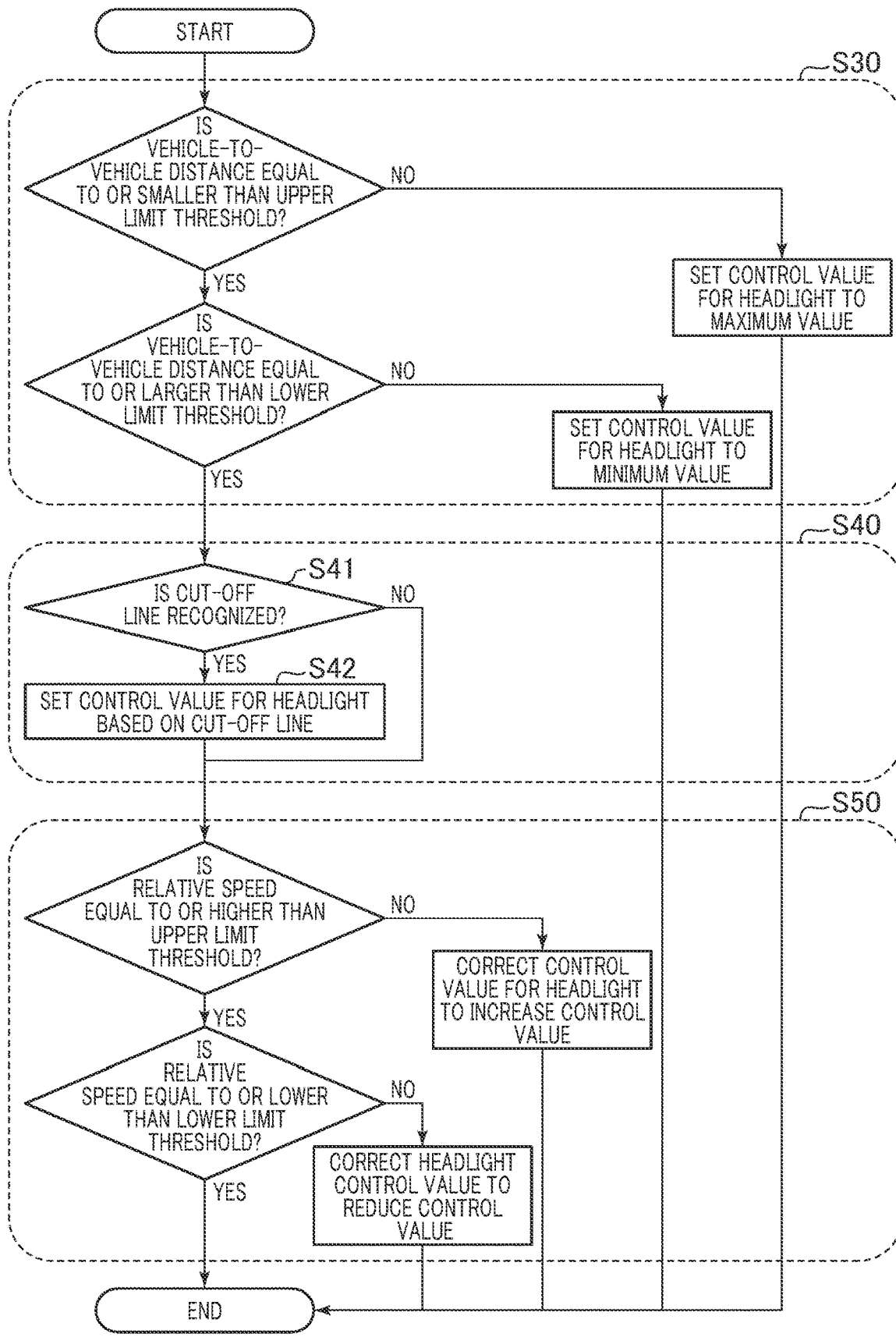
FIG. 6 is a flowchart of calculation of a control value for a light distribution pattern.

The sequence control section 201 resets the self-timer 203 (S08) and the control value calculation section 202 calculates the control value for the light distribution pattern (S09). A method for calculating the control value for the light distribution pattern is described later in detail with reference to FIG. 6.

In the present embodiment, the self-timer 203 is used to cancel the headlight control and return the control value to the standard value. When the license plate information is not extracted from the image frame (No in S04), or the preceding vehicle to be subjected to the headlight control is not extracted (target not present in S05), the sequence control section 201 starts counting of the self-timer 203 (S11). In S11, when the counting of the self-timer 203 is already started in a previous cycle, the counting is continued. When the counting of the self-timer 203 is not expired (No in S12), the counting of the self-timer 203 is continued and the light distribution pattern of the headlight is maintained. When the counting of the self-timer 203 is expired (Yes in S12), the control value for the light distribution pattern is set to change from a current value to the standard value in a step-by-step manner over a plurality of cycles (S13).

Since the self-timer 203 is used in this manner, even when the license plate cannot be temporarily recognized from the camera image due to a peripheral environment regardless of the presence of the preceding vehicle to be subjected to the control, the previous control value for the light distribution pattern is maintained for a certain time period, unnecessary headlight control can be avoided, and as a result, an adverse effect on the driver can be avoided. In addition, even when the counting of the self-timer 203 is expired and the headlight control does not need to be executed, the control is executed in a step-by-step manner, thereby being able to avoid a rapid automatic change (regardless of the driver's intension) in the light distribution pattern of the headlight and avoid an adverse effect on the driver.

The sequence control section 201 generates the headlight control signal including the control value for the light distribution pattern set in S09, S13, or S15. The headlight ECU 55 controls the headlight 50 based on the headlight control signal.

The flowchart of FIG. 4 is an example and can be variously modified based on the sensor mounted on the own vehicle. For example, when a multiocular camera (stereo camera) is mounted as the camera 10, the distance between the own vehicle and the preceding vehicle can be directly estimated based on parallax information of a plurality of image frames. In this case, in the license plate recognition (S03), the acquisition of the index information 552 is not required. Furthermore, for example, when the own vehicle has a millimeter wave radar, the millimeter wave radar can be used to detect the distance between the own vehicle and the preceding vehicle and the relative speed, and the detected information may be used.

Figure 7:
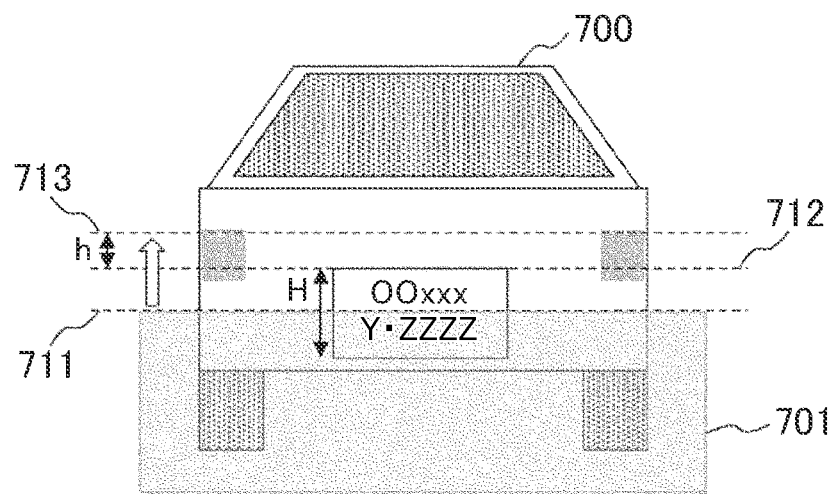
FIG. 7 is a diagram describing a positional relationship between a license plate and a cut-off line.

FIG. 7 illustrates a flowchart of the calculation of the control value for the light distribution pattern by the control value calculation section 202 in S09 of the flowchart of FIG. 4. A method for estimating the control value for the headlight in this step is divided into three stages. In addition, an upper limit and a lower limit are defined for the control value for the headlight in advance, and the control value for the headlight is in a range from the lower limit to the upper limit. For example, when the control value for the light distribution pattern is the angle of the optical axis of the headlight, the maximum control value causes the cut-off line to be present at the highest position and maximizes an irradiation region of a low beam, and the minimum control value causes the cut-off line to be present at the lowest position and minimizes the irradiation region of the low beam. The upper and lower limits of the control value for the light distribution pattern are stored in the auxiliary storage device 103 of the camera ECU 15.

The first stage is calculation (S30) based on the distance between the vehicles. When the distance to the preceding vehicle is short, the license plate is out of an imaging range and cannot be recognized. When the distance is long, the accuracy of recognizing the license plate relatively decreases. Therefore, when the control range is appropriately determined based on the distance between the vehicles and particularly when the camera 10 is a monocular camera, it is possible to secure the accuracy of estimating the distance between the vehicles and the relative speed for the recognition of the license plate.

As a specific method for the calculation, thresholds for upper and lower limits of the distance between the vehicles are set in advance and compared with the vehicle-to-vehicle distance estimated by the vehicle-to-vehicle estimation section 303. When the vehicle-to-vehicle distance is larger than the upper limit, the control value for the light distribution pattern is set to the maximum control value. When the vehicle-to-vehicle distance is smaller than the upper limit, the control value for the light distribution pattern is set to the minimum control value. In these cases, calculation in the following second stage (S40) and the following third stage (S50) is not performed to avoid an adverse effect on the driver of the own vehicle due to unnecessary headlight control. The upper and lower limits of the vehicle-to-vehicle distance are stored in the auxiliary storage device 103 of the camera ECU 15.

The second stage is calculation (S40) based on the cut-off line. The cut-off line recognition section 305 (refer to FIG. 3) of the image recognition section 300 detects the cut-off line included in the image frame. The cut-off line is also called a distinct boundary line and indicates an upper edge portion of the light distribution pattern of the low beam, and a region higher than the cut-off line is not substantially irradiated. The cut-off line recognition section 305 recognizes a difference between average luminance in the region higher than the cut-off line and average luminance in a region lower than the cut-off line to detect the cut-off line.

When the cut-off line recognition section 305 recognizes the cut-off line (Yes in S41), the control value for the light distribution pattern is set based on the cut-off line (S42). A method for setting the control value for the light distribution pattern in S42 is described with reference to FIG. 7. An example illustrated in FIG. 7 indicates a state in which the headlight of the own vehicle irradiates a region 701 for a vehicle 700. An upper end of the region 701 is a cut-off line 711. In this state, in the present embodiment, the control value for the light distribution pattern is calculated such that the cut-off line is present at a control target 713 at a predetermined height h from an upper end 712 of a license plate of the preceding vehicle. The license plate is appropriately irradiated by moving the cut-off line 711 to the control target 713 without dazzling the driver of the preceding vehicle. Therefore, the license plate can be appropriately extracted from an image, regardless of the distance between the vehicles.

Since an actual dimension H of a vertical side of the license plate is already recognized by the license plate recognition section 302, it is possible to calculate a distance between the upper end of the license plate and the cut-off line 711, and finally calculate a distance between the control target 713 and the cut-off line 711 and calculate the control value for the light distribution pattern. The predetermined height h may be a fixed value set in advance or may be a variable value set based on the shape of the preceding vehicle appearing in the image frame.

When the cut-off line recognition section 305 does not recognize the cut-off line due to a peripheral environment or the like (No in S41), the process skips S42 and proceeds to the third stage.

The third stage is correction (S50) based on the relative speed. For example, when it is predicted that the preceding vehicle will be accelerated and the distance between the vehicles will increase by using the relative speed, the irradiation range of the headlight is corrected to increase. Therefore, the driver can obtain the wider irradiation range and it is possible to maintain high accuracy of recognizing the license plate. On the other hand, when it is predicted that the preceding vehicle will be decelerated and the distance between the vehicles will decrease, the irradiation range of the headlight is corrected to decrease so as to prevent the driver of the preceding vehicle from being dazzled by light.

As a specific method for the calculation, thresholds for upper and lower limits of the relative speed are set in advance and compared with the relative speed estimated by the relative speed estimation section 304. When the relative speed is higher than the upper limit, the angle of the optical axis of the headlight is corrected to increase (the irradiation range is increased). When the relative speed is lower than the lower limit, the angle of the optical axis of the headlight is corrected to decrease (the irradiation range is reduced). For example, when the relative speed is equal to or higher than the upper threshold, it is predicted that the distance between the vehicles will increase and thus the control value for the light distribution pattern is corrected such that the angle of the optical axis of the headlight increases. On the other hand, when the relative speed is equal to or lower than the lower threshold, it is predicted that the distance between the vehicles will decrease and thus the control value for the light distribution pattern is corrected such that the angle of the optical axis of the headlight decreases. The upper and lower limits of the relative speed are stored in the auxiliary storage device 103 of the camera ECU 15. A plurality of thresholds may be provided for each of the upper and lower limits of the relative speed, and a correction amount of the control value for the light distribution pattern may be defined for each of the thresholds.

LIST OF REFERENCE SIGNS

10: Camera, 15: Camera ECU, 20: Function switch, 25: MHI ECU, 30: Sensor, 35: Sensor ECU, 40: Network, 50: Headlight, 55: Headlight ECU, 101: Processor, 102: Main storage, 103: Auxiliary storage device, 104: Network interface, 105: I/O port, 106: Bus, 200: Headlight control section (headlight control program), 201: Sequence control section, 202: Control value calculation section, 203: Self-timer, 300: Image recognition section (image recognition program), 301: Image frame acquisition section, 302: License plate recognition section, 303: Vehicle-to-vehicle estimation section, 304: Relative speed estimation section, 305: Cut-off line recognition section, 500: Image frame, 550: License plate information, 551: Plate ID, 552: Index information, 553: Coordinate information, 700: Preceding vehicle, 701: Region, 711: Cut-off line, 712: Upper end of license plate, 713: Control target

The invention claimed is:

1. A headlight control device that controls a light distribution pattern of a headlight, comprising:
   a processor;
   a storage device; and
   a headlight control program and an image recognition program that are stored in the storage device and executed by the processor, wherein
   the headlight control program includes a sequence control section that generates a headlight control signal from an image captured by a camera mounted on a vehicle, and a control value calculation section that calculates a control value for the light distribution pattern in the headlight control signal,
   the image recognition program includes a license plate recognition section that detects a license plate of a preceding vehicle from the image, and a cut-off line recognition section that detects a cut-off line of the headlight from the image, and
   the control value calculation section calculates the control value for the light distribution pattern such that the cut-off line detected by the cut-off line recognition section is positioned higher by a predetermined height than an upper end of the license plate detected by the license plate recognition section.

2. The headlight control device according to claim 1, wherein
   the sequence control section receives input of a function switch that turns on and off a function of controlling the light distribution pattern of the headlight, and
   when the function switch is off, the calculation of the control value for the light distribution pattern is not performed using the image, and the control value for the light distribution pattern is set to a standard value.

3. The headlight control device according to claim 1, wherein
   the license plate recognition section determines, based on a coordinate of the detected license plate in the image, whether the license plate is to be subjected to the control of the light distribution pattern.

4. The headlight control device according to claim 3, wherein
   the headlight control program includes a self-timer,
   when the license plate recognition section extracts the license plate to be subjected to the control of the light distribution pattern, the sequence control section resets the self-timer, and
   when the license plate recognition section does not extract the license plate to be subjected to the control of the light distribution pattern, the sequence control section causes the self-timer to count up.

5. The headlight control device according to claim 4, wherein
   the sequence control section generates the headlight control signal in a predetermined cycle, and
   when the counting of the self-timer is expired, the sequence control section sets the control value for the light distribution pattern in the head control signal such that the control value for the light distribution pattern changes to a standard value in a step-by-step manner over a plurality of the cycles.

6. The headlight control device according to claim 1, wherein
   the control value for the light distribution pattern is an angle of an optical axis of the headlight,
   the control value calculation section calculates the control value such that the angle of the optical axis is in a range from a predetermined minimum control value and a predetermined maximum control value,
   when a distance between the own vehicle and the preceding vehicle is larger than a predetermined upper limit, the control value calculation section sets the angle of the optical axis to the maximum control value, and
   when the distance between the vehicles is smaller than a predetermined lower limit, the control value calculation section sets the angle of the optical axis to the minimum control value.

7. The headlight control device according to claim 6, wherein
   the image recognition program includes a vehicle-to-vehicle distance estimation section that estimates the distance between the vehicles,
   the license plate recognition section calculates index information to identify an actual dimension of the license plate from the detected license plate, and
   the vehicle-to-vehicle distance estimation section estimates the distance between the vehicles based on the actual dimension of the license plate that was identified from the index information and a size of the license plate in the image.

8. The headlight control device according to claim 7, wherein
   the index information is a classification number described on the license plate or is an aspect ratio of the license plate.

9. The headlight control device according to claim 1, wherein
   the control value for the light distribution pattern is an angle of an optical axis of the headlight,
   when a relative speed of the own vehicle to a speed of the preceding vehicle is higher than a predetermined upper limit, the control value calculation section corrects the control value for the light distribution pattern such that the angle of the optical axis increases, and
   when the relative speed is lower than a predetermined lower limit, the control value calculation section corrects the control value for the light distribution pattern such that the angle of the optical axis decreases.

10. The headlight control device according to claim 9, wherein
    the image recognition program includes a relative speed estimation section that estimates the relative speed, and
    the relative speed estimation section estimates the relative speed based on the speed of the own vehicle, the distance between the own vehicle and the preceding vehicle, a past value of the speed of the own vehicle, and a past value of the distance between the vehicles.

11. A headlight control system comprising:
a camera mounted on a vehicle;
a camera ECU that controls the camera and generates a headlight control signal from an image captured by the camera;
a headlight;
a headlight ECU that controls the headlight based on the headlight control signal; and
a network that connects the camera ECU to the headlight ECU such that the camera ECU and the headlight ECU are able to communicate with each other, wherein
the camera ECU detects a license plate of a preceding vehicle and a cut-off line of the headlight from the image, calculates a control value for a light distribution pattern of the headlight such that the cut-off line is positioned higher by a predetermined height than an upper end of the license plate, and generates the headlight control signal including the control value for the light distribution pattern.

12. The headlight control system according to claim 11, further comprising:
a function switch that turns on and off a function of controlling the light distribution pattern of the headlight; and
an HMI ECU that is connected to the network and transfers the turning on and off of the function switch to the camera ECU, wherein
when the function switch is off, the camera ECU does not calculate the control value for the light distribution pattern using the image and sets the control value for the light distribution pattern to a standard value.

13. A headlight control method for controlling a light distribution pattern of a headlight of a vehicle, comprising:
detecting, from an image captured by a camera mounted on the vehicle, a license plate of a preceding vehicle;
detecting a cut-off line of the headlight from the image; and
calculating a control value for the light distribution pattern such that the cut-off line is positioned higher by a predetermined height than an upper end of the license plate.

14. The headlight control method according to claim 13, further comprising:
determining, based on a coordinate of the detected license plate in the image, whether the license plate is to be subjected to the control of the light distribution pattern.

15. The headlight control method according to claim 14, further comprising:
generating a headlight control signal including the control value for the light distribution pattern in a predetermined cycle; and
setting, when the license plate to be subjected to the control of the light distribution pattern is not detected, the control value for the light distribution pattern in the headlight control signal such that the control value for the light distribution pattern changes to a standard value in a step-by-step manner over a plurality of the cycles after a predetermined time period elapses.

\* \* \* \* \*